(12) United States Patent
Wang et al.

(10) Patent No.: US 7,326,494 B2
(45) Date of Patent: Feb. 5, 2008

(54) COMPOSITE MATERIAL AND ELECTRODES MADE THEREFROM

(75) Inventors: Liya Wang, Ann Arbor, MI (US); Chuanjing Xu, Ann Arbor, MI (US); John M. Miller, Ann Arbor, MI (US)

(73) Assignee: T/J Technologies, Inc., Ann Arbor, MI (US)

(*) Notice: Subject to any disclaimer, the term of this patent is extended or adjusted under 35 U.S.C. 154(b) by 616 days.

(21) Appl. No.: 10/766,385

(22) Filed: Jan. 28, 2004

(65) Prior Publication Data
US 2004/0185343 A1    Sep. 23, 2004

Related U.S. Application Data

(60) Provisional application No. 60/443,663, filed on Jan. 30, 2003.

(51) Int. Cl.
*H01M 4/58* (2006.01)

(52) U.S. Cl. .................. 429/218.1; 252/182.1; 423/306; 423/351; 423/385

(58) Field of Classification Search ............ 429/218.1; 252/182.1; 423/306, 351, 385
See application file for complete search history.

(56) References Cited

U.S. PATENT DOCUMENTS

| | | | |
|---|---|---|---|
| 5,817,436 A | 10/1998 | Nishijima et al. | 429/194 |
| 5,871,866 A | 2/1999 | Barker et al. | 429/231.1 |
| 5,910,382 A | 6/1999 | Goodenough et al. | 429/218.1 |
| 5,948,569 A | 9/1999 | Moses et al. | 429/246 |
| 6,132,905 A * | 10/2000 | Kumar et al. | 429/322 |
| 6,153,333 A | 11/2000 | Barker | 429/218.1 |
| 6,190,806 B1 | 2/2001 | Kumar et al. | 429/317 |
| 6,391,493 B1 | 5/2002 | Goodenough et al. | 429/218.1 |
| 6,447,951 B1 | 9/2002 | Barker et al. | 429/218.1 |
| 6,514,640 B1 | 2/2003 | Armand et al. | 429/231.1 |
| 2002/0195591 A1 | 12/2002 | Ravet et al. | 252/500 |
| 2003/0064287 A1 | 4/2003 | Masquelier et al. | 429/221 |

\* cited by examiner

*Primary Examiner*—Gregg Cantelmo
(74) *Attorney, Agent, or Firm*—Gifford Krass Sprinkle Anderson & Citkowski

(57) ABSTRACT

A composite material having utility as a cathode material for a lithium ion battery includes a first component which is a metal phosphate and a second component which is a metal nitride, a metal oxynitride, or a mixture of the two. The second component is coated on, or dispersed through the bulk of, the first component. The metal phosphate may be a lithiated metal phosphate and may be based upon one or more transition metals. Also disclosed is a method for preparing the material as well as electrodes fabricated from the material and lithium ion cells which include such electrodes.

16 Claims, 1 Drawing Sheet

COMPOSITE MATERIAL AND ELECTRODES MADE THEREFROM

RELATED APPLICATION

This application claims priority of U.S. Provisional Patent Application Ser. No. 60/443,663 filed Jan. 30, 2003 entitled "Electrode Material."

FIELD OF THE INVENTION

This invention relates generally to materials. More specifically, the invention relates to composite materials having utility as a cathode material for electrochemical devices. Most particularly, the invention relates to materials having particular utility as cathode materials for high power lithium ion batteries.

BACKGROUND OF THE INVENTION

Significant effort has been expended toward developing high power rechargeable batteries for use in hybrid electric vehicles and other such high power applications. Lithium ion batteries are capable of stably storing relatively large amounts of power, and efforts are being undertaken to fabricate practical, high power batteries employing lithium ion technology. However, the full potential of such battery technology has not been realized because of a shortage of appropriate electrode materials, particularly cathode materials.

A number of materials are currently being investigated for use as cathodes in high power lithium batteries, such as those employed in hybrid electric vehicles; and one such group of materials comprises lithiated transition metal phosphates such as $LiFePO_4$. However, these materials have relatively low electrical conductivity, which restricts their use as electrode materials.

A number of attempts have been made in the prior art to increase the electrical conductivity of such materials by including metals or other elements either as dopants or as secondary components of the materials. In other instances, prior art materials have been employed in particular configurations in an attempt to accommodate their low electrical conductivity. Some prior art materials and configurations are shown in U.S. Pat. No. 6,514,640; 6,391,493; 6,447,951; 5,910,382 and 5,871,866; and in U.S. Patent Applications 2002/0195591 and 2003/0064287. Increases in electrical conductivity in such prior art materials are generally accompanied by a loss of volumetric charge storage capacity which limits the utility of these materials in high power batteries.

Accordingly, there is a need for improved materials which can be employed as a component of cathodes for lithium ion batteries. Such materials should have good electrical conductivity, be stable, easy to manufacture, low in cost and highly efficient. As will be described in detail hereinbelow, the present invention provides materials and methods which meet these requirements.

BRIEF DESCRIPTION OF THE INVENTION

There is disclosed herein a composite material which is comprised of a first component which is a metal phosphate and a second component which is a metal nitride, a metal oxynitride, or a combination of the nitride and oxynitride. The metal phosphate may be a lithiated metal phosphate, and in particular embodiments it may have an olivine or nasicon structure. In particular embodiments, the material is configured so that the first component comprises a core and the second component is present on at least a portion of the surface of the core. In other embodiments, the second component is disposed in at least a portion of the bulk of the first component. The first component may comprise a transition metal phosphate, and some particular transition metals used in this regard comprise Fe, V and Mn. The phosphate may be a mixed metal phosphate. The metal of the second component may be the same as, or different from, the metal of the first component. The composite material may be doped. Also disclosed herein is an electrode fabricated from the composite material as well as a lithium ion battery having a cathode comprised of the composite material.

Further disclosed herein is a method for manufacturing the composite material of the present invention. According to the method, a plurality of precursor compounds of the first component are mixed together. These precursor compounds can include a metal containing compound, a lithium containing compound and a phosphorus containing compound. The mixture is calcined so as to produce a lithiated phosphate of the metal, and this lithiated phosphate is subjected to a nitriding process wherein a portion of the lithiated phosphate of the metal is converted to a nitride or an oxynitride of the metal.

DETAILED DESCRIPTION OF THE INVENTION

Figure 1:
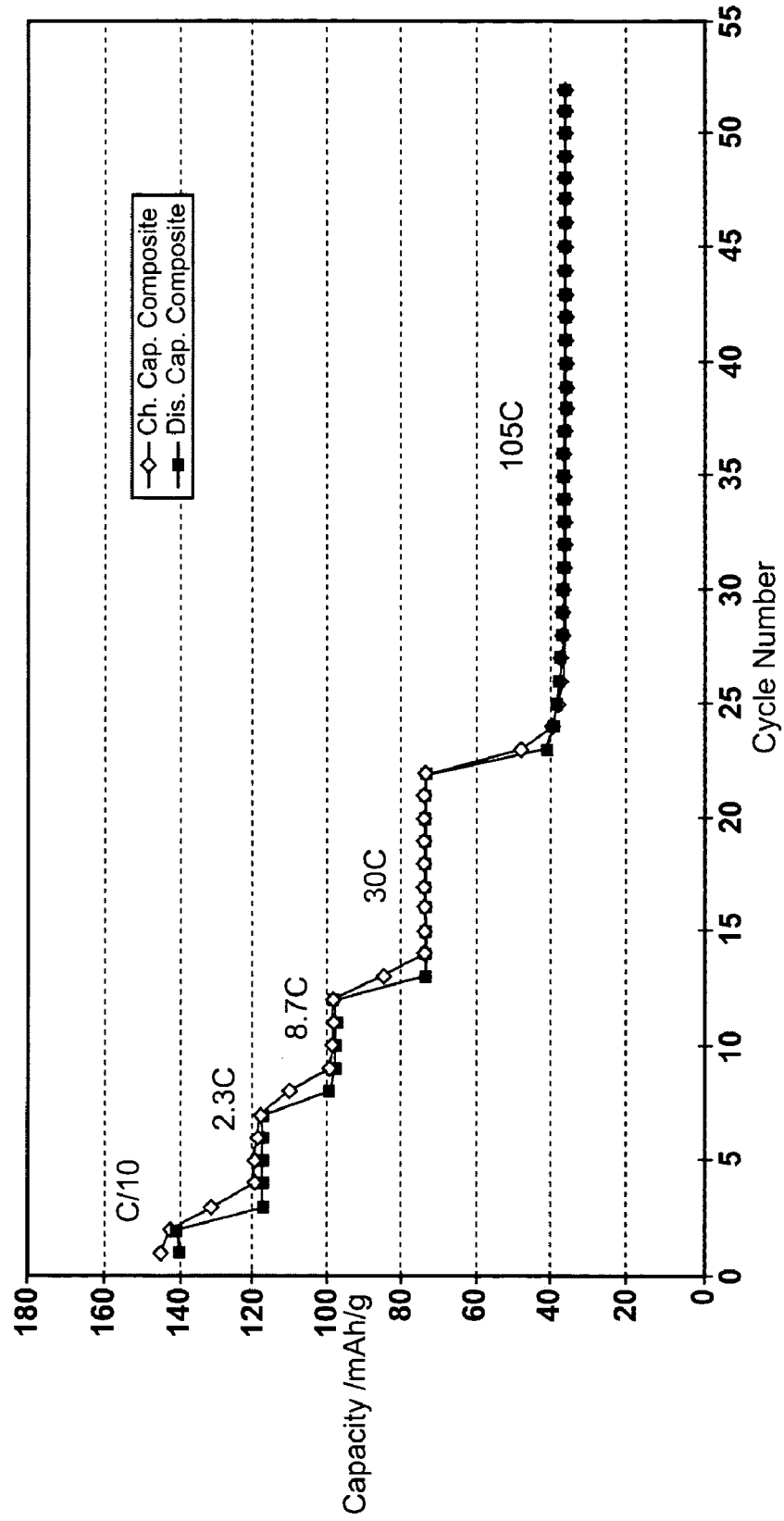
FIG. 1 is a graph showing the rate capability of lithium ion cathodes made from materials of the present invention.

Materials having a phospho-olivine structure have been investigated as electrode materials for high power lithium ion batteries and the like. However, while such materials have good charge storage capacity, which would make them useful as electrode materials, their low electrical conductivity has heretofore limited their utility. As will be described in greater detail hereinbelow, the present invention is directed to lithiated metal phosphate compounds which may have an olivine or nasicon structure, which materials are further characterized by having improved electronic conductivity. The materials of the present invention are composite materials wherein a first component is constituted by a compound which is a lithiated phosphate of a metal. The compounds are further characterized in that at least a portion of the first component includes a nitride or an oxynitride of a metal either coated thereupon or dispersed therein. The nitride or oxynitride greatly improves the electronic conductivity of the material, while the first component provides for charge storage.

The lithiated phosphate compound preferably has an olivine or nasicon structure. The metal component of the material is most preferably a transition metal, and it is to be understood that the materials of the present invention may include a mixture of metals, or may be based upon a single metal. Some particularly preferred transition metals for use in the present invention include: Fe, V, and Mn taken either singly or in combination. In accord with the present invention, it has been found that the material may be doped to modify or otherwise improve its electrical properties. Doping is accomplished by inclusion of one or more dopants into the material. Doping may be at the site of the lithium or the metal; doping may also be at the anion site by the use of species such as: halogens, $(SO_4)^{-2}$, $(SiO_4)^{-4}$, $(TiO_4)^{-4}$, or $(AlO_3)^{-3}$. Some particularly preferred dopant elements include carbon and any divalent or trivalent metal ions; other dopant ions include $Nb^{+5}$, $Zr^{+4}$, $Ti^{+4}$, or $W^{+6}$. The dopants may be employed either singly or in combination.

The first component of the composite material may be in the form of one or more particles, referred to as "cores." At least a portion of the outer surface of the core particles is coated with a nitride or oxynitride of a metal, which metal will typically be the metal comprising the core portion. In addition, or alternatively, the nitride or oxynitride component may be present in the bulk of the core material. The nitride or oxynitride component is most preferably formed in situ by a conversion reaction where a portion of the lithiated metal phosphate is converted into an oxide or oxynitride of the metal. However, it is to be understood that the nitride or oxynitride component may be formed by other processes such as sputtering, evaporation, ion beam techniques, and the like.

The materials of the present invention may be fabricated by a variety of methods. One particularly preferred group of techniques comprises a conversion process wherein precursor materials are mixed together and reacted. In one such conversion process, a mixture of precursor compounds comprising a metal containing compound, a lithium containing compound, and a phosphate containing compound are mixed together and reacted to produce a lithiated phosphate of the metal. Particles of this lithiated phosphate compound are then subjected to a further conversion process wherein portions thereof are converted to nitrides or oxynitrides of the metal.

For example, a composite material of the present invention may be prepared in a process wherein an initial mixture of the metal containing compound, the lithium containing compound and the phosphate containing compound are mixed by a high impact milling process such as ball milling, grinding, attritor milling or the like to produce a very fine mixture of the compounds. This precursor mixture is then calcined by exposure to high temperature conditions, preferably under an inert atmosphere. Calcining causes the materials to react to produce the lithiated metal phosphate compound which is the first component of the composite material. Materials reacted in this manner maintain high surface areas making them very suitable for use in electrodes. The particles of lithiated metal phosphate are then subjected to a nitriding process which converts at least a portion of the outer surface thereof into a nitride or oxynitride of the metal. Nitriding may be preferentially accomplished by treatment of the material with a nitriding atmosphere, such as an ammonia containing atmosphere, at an elevated temperature. In a preferred process, a temperature programmed reaction is employed for nitriding wherein an atmosphere of a nitriding gas is flowed across the material while temperature is raised, maintained at a set level, and decreased in accord with a preselected profile. After the end of the nitriding reaction, the sample is typically cooled under an inert atmosphere and then passivated utilizing an oxygen containing atmosphere.

In specific embodiments of the foregoing process, the lithium containing compound may comprise lithium carbonate, lithium hydroxide, or organo-lithium compounds. The transition metal may be present as an oxalate salt, an oxide, or any other such compound. In those instances where iron is a component of the material, $Fe^{+2}$ oxalate is one preferred compound. The phosphate may be present in the form of various phosphate salts, and ammonium phosphates are one particularly preferred group of phosphates. Specifically, ammonium dihydrogen phosphate has found utility in the practice of the present invention. It is to be understood that in some instances the precursor compounds may include several of the species therein. For example, lithium phosphate may be employed as the source of both lithium and phosphate ions.

In many instances, it is advantageous to include one or more dopant elements in the material of the present invention, and such dopant materials are most advantageously incorporated into the mixture employed for the synthesis of the lithiated metal phosphate. The dopants can also be employed in the form of metallic compounds as discussed above. Presence of dopants can alter the conductivity, reactivity or electrochemical properties of the finished material. The dopants can be included in the mixture in the form of compounds or as free elements. In some instances, the dopants may be added to the composite material of the present invention after it is synthesized. This can be accomplished by subsequent chemical reaction or by physical techniques such as ion implantation and the like.

The materials of the present invention have been found to have good utility as components of electrodes for electrochemical devices in general, and as cathodes for rechargeable lithium ion batteries in particular. Cathodes in accord with the present invention are low in cost, stable and highly efficient, and have significant utility in high power lithium ion batteries of the type contemplated for use in hybrid electric vehicles. The cathodes of the present invention have good electrical conductivity and show a high charge storage capacity, leading to high energy and power density.

A composite material of the present invention was prepared according to the following process. A mixture of precursor compounds was prepared from a mixture of $Li_2CO_3$, $FeC_2O_4 \cdot 2 H_2O$, $NH_4H_2PO_4$, and $ZR(OC_3H_7)_4$ with a mole ratio of 0.50:0.95:0.025:0.0003. These materials were slurried in acetone and ball milled for approximately 96 hours in polymeric vials using zirconia milling media. Following milling, the material is air dried to remove the acetone and ground with a mortar and pestle.

The resulting mixture was subsequently calcined by heating. This resulted in the production of a lithium iron phosphate compound which was subsequently partially nitrided by a temperature profiled reaction employing an ammonia flow in a tube furnace. In this instance, calcining and nitriding were carried out serially, in a single process; although it is to be understood that the reactions may be carried out in separate processes.

The calcining and nitriding was done by a Temperature Programmed Reaction (TPR) with ammonia in a tube furnace. The temperature profile for the nitridation reaction can be described as follows: the temperature was ramped from RT to 350° C. in 2 hours, then ramped from 350° C. to 600° C. in 3 hours, and then kept constant at 600° C. for 2 hours. At the end of the reaction, the sample was allowed to cool to approximately 90° C. while the flow of ammonia was maintained. Thereafter, the material was passivated under an oxygen/helium atmosphere while it cooled to room temperature. This produced a high surface area 20-30 $m^2/g$ composite material in accord with the present invention.

This material was formed into cathodes which were then incorporated into lithium ion cells. To prepare electrodes, the cathode material was mixed with carbon black and binder solution (PVDF in n-methyl pyrrolidinone) to form a paste. The mass ratio of active material:binder:carbon black was 77:15:8. The paste was coated onto Cu foil substrate by blade casting. The electrodes were then dried at 110° C. overnight under vacuum. The typical electrode dimension was 2 cm×2 cm×40 μm with a mass loading of 5 $mg/cm^2$ The thus-prepared cathodes were incorporated into lithium cells for testing. In this regard, two-electrode pouch cells using Li as the counter and reference electrode were assembled in an Ar-filled dry box. The electrodes were placed between two Class PPD films (from Shield Pack Inc.) in the following order: working electrode (cathode), separator, and counter electrode. After being filled with electrolyte solution (1 M $LiPF_6$ in 1:1 EC/DEC), the pouch cells were completely heat sealed at the edge of the Class PPD films. The pouch cells were clamped between two plastic plates with C-clampers and tested outside the dry box.

To test the rate capability of the thus-produced cells, each half cell was cycled at 25° C. at current densities of 13.5, 275, 850, 2200, and 4200 mA/g for 2, 5, 5, 10, and 30 cycles, respectively. The cut-off voltages for charge and discharge were 4.2 and 2.0 volt vs. Li reference electrode. The energy storage capacities at different current densities were measured and C-rates were calculated according to the actual charge/discharge time in hours. FIG. 1 illustrates the rate capability of the composite cathode materials.

In accord with the present invention, still other modifications and variations of the invention will be apparent to those of skill in the art. While the foregoing describes the fabrication of a material which is lithiated ab initio, some or all of the lithium in the material may be subsequently added in an electrochemical reaction. For example, the unlithiated or partially lithiated material may be incorporated into an electrode which is disposed in a lithium ion cell, and during charging of the cell, the material will become lithiated. Also, while the foregoing example describes a material based upon iron, other metals, including mixtures of metals, may be similarly employed. In particular, it is anticipated that vanadium and manganese may be used with particular advantage in materials of this type.

The foregoing discussion, description and example are illustrative of particular embodiments of the invention, but they are not meant to be limitations upon the practice thereof. It is the following claims, including all equivalents, which define the scope of the invention.

The invention claimed is:

1. A composite material comprising:
    a first component which is a phosphate of a metal selected from the group consisting of: Fe, V, Mn, and combinations thereof; and
    a second component which is selected from the group consisting of: metal nitrides, metal oxynitrides, and combinations thereof.

2. The material of claim 1, wherein said metal phosphate is a lithiated metal phosphate.

3. The composite material of claim 1, wherein said first component comprises a core and said second component is present on at least a portion of the surface of said core.

4. The composite material of claim 1, wherein said second component is disposed in at least a portion of the bulk of said first component.

5. The composite material of claim 1, wherein said first component has an olivine or nasicon structure.

6. The composite material of claim 1, wherein said second component is selected from the group consisting of: transition metal nitrides, transition metal oxynitrides, and combinations thereof.

7. The composite material of claim 1, further including a dopant.

8. The composite material of claim 7, wherein said dopant is selected from the group consisting of: carbon, a metal ion having a +2 valence, a metal ion having a +3 valence, $Nb^{+5}$, $Zr^{+4}$, $Ti^{+4}$, $W^{+6}$, and combinations thereof.

9. The composite material of claim 1, wherein said first component is substitutionally doped at the phosphate site by a member selected from the group consisting of: halogens, $(SO_4)^{-2}$, $(SiO_4)^{-4}$, $(TiO_4)^{-4}$, $(AlO_3)^{-3}$, and combinations thereof.

10. An electrode comprising a composite material, said composite material comprising: a first component which is a phosphate of a metal selected from the group consisting of: Fe, V, Mn, and combinations thereof, and a second component which is selected from the group consisting of: metal nitrides, metal oxynitrides, and combinations thereof.

11. The electrode of claim 10, wherein said metal phosphate is a lithiated metal phosphate.

12. The electrode of claim 10, wherein said first component comprises a core and said second component is present on at least a portion of the surface of said core.

13. The electrode of claim 10, wherein said second component is dispersed in at least a portion of the bulk of said first component.

14. The electrode of claim 10, wherein said second component is selected from the group consisting of: transition metal nitrides, transition metal oxynitrides, and combinations thereof.

15. The electrode of claim 10, where said metal phosphate has an olivine or a nasicon structure.

16. The electrode of claim 10, wherein said composite material includes a dopant.

* * * * *